US011168802B2

(12) United States Patent
Bonanno

(10) Patent No.: US 11,168,802 B2
(45) Date of Patent: Nov. 9, 2021

(54) VALVE PISTON SEAL

(71) Applicant: Vitesco Technologies GmbH, Hannover (DE)

(72) Inventor: Rosario Bonanno, Bad Soden (DE)

(73) Assignee: Vitesco Technologies GmbH, Hannover (DE)

(\*) Notice: Subject to any disclaimer, the term of this patent is extended or adjusted under 35 U.S.C. 154(b) by 0 days.

(21) Appl. No.: 16/471,791

(22) PCT Filed: Dec. 13, 2017

(86) PCT No.: PCT/EP2017/082640
§ 371 (c)(1),
(2) Date: Jun. 20, 2019

(87) PCT Pub. No.: WO2018/114529
PCT Pub. Date: Jun. 28, 2018

(65) Prior Publication Data
US 2020/0116272 A1 Apr. 16, 2020

(30) Foreign Application Priority Data
Dec. 22, 2016 (DE) .................... 102016226106.1

(51) Int. Cl.
*F16K 1/46* (2006.01)
*F16K 27/02* (2006.01)
(Continued)

(52) U.S. Cl.
CPC .......... *F16K 27/029* (2013.01); *F02B 37/162* (2019.05); *F16K 1/46* (2013.01); *F16K 25/005* (2013.01); *F16K 31/0655* (2013.01)

(58) Field of Classification Search
CPC .......... F16K 1/46; F16K 17/20; F16K 25/005; F16K 27/029; F16K 31/0655;
(Continued)

(56) References Cited

U.S. PATENT DOCUMENTS 4,156,439 A * 5/1979 Jeffries .............. F16K 11/0525
137/625.46
6,039,323 A * 3/2000 Mockenhaupt ......... F02F 7/006
277/593

(Continued)

FOREIGN PATENT DOCUMENTS

CN 204628789 U 9/2015
CN 105612328 5/2016
(Continued)

OTHER PUBLICATIONS

Office Action dated Jun. 24, 2020 issued in Korean Patent Application No. 10-2019-7020964.
(Continued)

*Primary Examiner* — Matthew W Jellett
(74) *Attorney, Agent, or Firm* — Cozen O'Connor

(57) ABSTRACT

A valve having a housing, a solenoid arranged in the housing, a pin movable by the solenoid, a piston connected to the pin, a second housing part that bears against the housing and which partially accommodates the piston, and a seal arranged between the second housing part and piston. The seal is connected to the second housing part. The seal surrounds a region of the second housing part such that the region forms at least one undercut for the seal.

11 Claims, 3 Drawing Sheets

(51) Int. Cl.
*F02B 37/16* (2006.01)
*F16K 31/06* (2006.01)
*F16K 25/00* (2006.01)

(58) Field of Classification Search
CPC .... F16K 31/0686; F16K 39/024; F02B 37/16; F02B 37/162; F02B 2039/166
See application file for complete search history.

(56) References Cited

U.S. PATENT DOCUMENTS

| | | | |
|---|---|---|---|
| 8,668,203 B2 * | 3/2014 | Sakata | F01L 3/08 |
| | | | 277/502 |
| 2003/0042450 A1 | 3/2003 | Bircann | |
| 2008/0203344 A1 * | 8/2008 | Cobb | F02M 17/04 |
| | | | 251/129.17 |
| 2012/0313329 A1 | 12/2012 | Battles | |
| 2013/0200574 A1 | 8/2013 | Hegemier et al. | |
| 2013/0269599 A1 * | 10/2013 | Lin | C23C 16/4412 |
| | | | 117/88 |
| 2013/0313455 A1 | 11/2013 | Bittner | |
| 2017/0261113 A1 * | 9/2017 | Sato | B60T 8/363 |
| 2017/0298812 A1 * | 10/2017 | Lenk | F16K 27/029 |

FOREIGN PATENT DOCUMENTS

| | | |
|---|---|---|
| DE | 102008031738 | 1/2010 |
| DE | 10 2012 211575 | 1/2014 |
| DE | 10 2014 113550 | 3/2016 |
| JP | S 63-009568 | 1/1988 |
| JP | 2004-003541 | 1/2004 |
| JP | 2016-008683 | 1/2016 |
| WO | WO 2014/068765 | 5/2014 |
| WO | WO 2016/041659 | 3/2016 |
| WO | WO 2016/041743 | 3/2016 |
| WO | WO 2016/041951 | 3/2016 |
| WO | WO 2016/162968 | 10/2016 |

OTHER PUBLICATIONS

Office Action dated Sep. 2, 2020 issued in Chinese Patent Application No. 201780079597.5.
Office Action dated Dec. 14, 2020 issued in Korean Patent Application No. 10-2019-7020964.
Office Action dated Jul. 14, 2021 issued in Chinese Patent Application No. 201780079597.5.

* cited by examiner

VALVE PISTON SEAL

CROSS REFERENCE TO RELATED APPLICATIONS

This is a U.S. national stage of application No. PCT/EP2017/082640, filed on Dec. 13, 2017. Priority is claimed on Germany Application No. DE102016226106.1, filed Dec. 22, 2016, the content of which is incorporated here by reference.

BACKGROUND OF THE INVENTION

1. Field of the Invention

The invention relates to a valve having a housing, a solenoid arranged in the housing, a pin movable by the solenoid, and a piston connected to the pin, a second housing part that bears against the housing and which partially accommodates the piston, and a seal arranged between the second housing part and piston.

2. Description of the Prior Art

Such valves are used, inter alia, as a diverter valve on a turbocharger in motor vehicles to open up a bypass to a suction side in overrun operation, and are known. To prevent excessive deceleration of the turbocharger and to ensure a fast launch, fast opening and closing of the valve is an essential prerequisite. In particular during a closing process, immediate closure as a result of abutment of the piston against a valve seat is of importance. The valve seat is formed by the housing of the turbocharger, on which the valve is flange-mounted. In addition, the axially displaceable piston must be sealed against the housing. For this purpose, it is known to arrange a V-shaped seal in the housing, the limbs of which bear in each case against the second housing part and against a lateral surface of the piston. The seal furthermore requires fixing in the housing part in order to ensure sealed abutment against the piston. For this purpose, the seal is pressed together with the second housing part by means of a further component. This however requires additional outlay in terms of construction, which leads to higher costs of such valves.

SUMMARY OF THE INVENTION

One aspect of the invention is based on providing a valve with improved sealing function. At the same time, it is the intention for the valve to be of simpler construction and inexpensive.

According to one aspect of the invention, the seal is connected to the second housing part, wherein the seal surrounds a region of the second housing part such that said region forms at least one undercut for the seal.

The connection of the seal to the housing part, by virtue of the seal surrounding a region of the second housing part in such a way that an undercut is formed, ensures a secure and reliable seat of the seal on the housing part. An undercut is understood to mean a design of the seal and/or the housing part that does not permit the removal of the seal from its predetermined position by a simple translational or rotational movement, or which at least impedes such a movement such that a removal of the seal is possible only by damaging the seal. The advantage of the valve according to one aspect of the invention is that the seal is reliably held in its position over the service life by the at least one undercut. Additional fastening elements are not necessary for this purpose. In this way, a particularly inexpensive valve can be produced. Furthermore, undercuts can be generated even with small dimensions, such that the valve requires no additional structural space in the region of the second housing part.

In a simple refinement, the undercut comprises at least one region, wherein the region is formed by a radius. In the simplest case, that end of the second housing part that is averted from the housing is angled. Here, the angle may lie between 5° and 180°, preferably 90°. It has been found that the security against detachment increases with increasing angle.

The security against detachment of the seal can also be increased by virtue of the undercut being formed by multiple regions formed by radii.

In another advantageous refinement, the undercut comprises at least one region that has at least one recess, preferably 2 to 12 recesses and in particular 4 to 8 recesses. By virtue of the seal filling these recesses, the seal is non-separably connected to the second housing part.

Although each of the undercuts just described already provides sufficient security on its own against a detachment of the seal, it may nevertheless be expedient to provide a combination of regions formed by radii and recesses. In particular if the valve is used under particularly harsh external conditions.

To achieve a good sealing action with little wear over the entire service life, an advantageous refinement consists in producing the seal from a fluorinated rubber (FKM rubber). This material is sufficiently robust and allows reliable operation of the valve even at temperatures of 180° C.

To achieve a particularly secure connection to the second housing part, the seal can be vulcanized on the second housing part.

According to a further advantageous refinement, the service life of the seal is lengthened by virtue of the seal having a sealing lip that acts in an axial direction. By this orientation of the sealing action, the seal makes contact with the piston only in one position, specifically an end position. Permanent contact with the piston, in particular during the movement of the piston with the associated friction, is avoided.

In a particularly advantageous refinement, good resistance to a wide variety of throughflowing media and media mixtures, preferably exhaust gas of an internal combustion engine, is achieved in that the second housing part is composed of metal, preferably of high-grade steel, in particular of a chromium-nickel steel. Furthermore, the second housing part can thus be formed with sufficient dimensional stability even with small wall thicknesses in the range from 0.3 mm to 3 mm, preferably 0.5 mm to 1 mm.

According to a further advantageous refinement, the second housing part can be produced particularly inexpensively as a deep-drawn part. The shaping of the second housing part can be achieved in only one working step without further processing operations.

Equally, it is advantageous if the piston is composed of metal, preferably of high-grade steel, in particular a chromium-nickel steel. Such a piston can likewise be produced by deep drawing, whereby the sealing surface for the seal on the second housing part can be formed in one working step. The valve according to the invention can thus be manufactured particularly inexpensively.

With the arrangement of an axially acting seal that interacts with the piston only in the closed state, the contact of seal and piston is limited to a period of time in which the piston is at rest, including a period of time immediately before the piston comes to rest. This means that piston and seal make contact shortly before the closed position. With the final movement of the seal into the closed position, the seal is deformed such that the sealing surfaces are preloaded against one another. With the axially acting seal, the seal is thus prevented from being in contact with the piston, and being subject to associated friction, during the movement of the piston during the opening and closing processes. Friction-induced wear is thus prevented, and the service life of the seal is improved.

BRIEF DESCRIPTION OF THE DRAWINGS

The invention will be described in more detail on the basis of an exemplary embodiment. In the figures.

DETAILED DESCRIPTION OF THE PRESENTLY PREFERRED EMBODIMENTS

Figure 1:
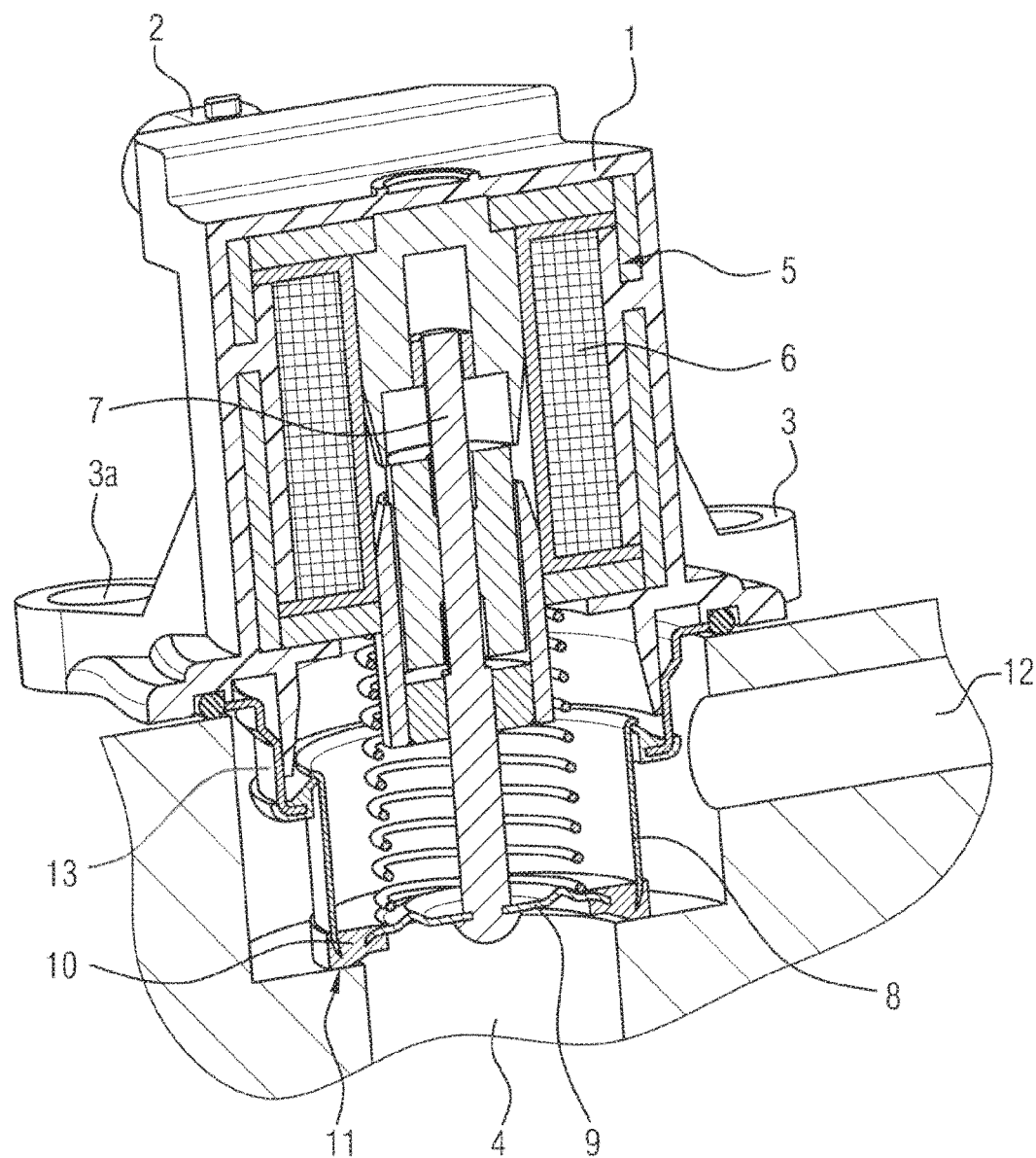
FIG. 1 is a sectional illustration of the valve according to the invention.

FIG. 1 shows the valve comprising a housing 1 with an integrally molded socket 2 for the electrical connection of the valve. The housing 1 furthermore has an integrally formed flange 3 and three bores 3*a*, by which the housing 1 is flange-mounted on a turbocharger (not illustrated) in a region of a bypass line 4. In the installed position shown, the flange 3 is adjoined by a second housing part 13. In the housing 1, there is arranged a solenoid 5 with a coil 6 and a metal pin 7. The metal pin 7 is connected to a pot-shaped piston 8, which, at the circumference of its base 9, has an axially projecting annular seal 10. In the closed position shown, the seal 10 bears against the valve seat 11 to close off the bypass line 4, so that no medium can flow from the line 4 into the line 12. Here, a spring 7*a* pushes the piston 8 in the direction of the valve seat 11.

Figure 2:
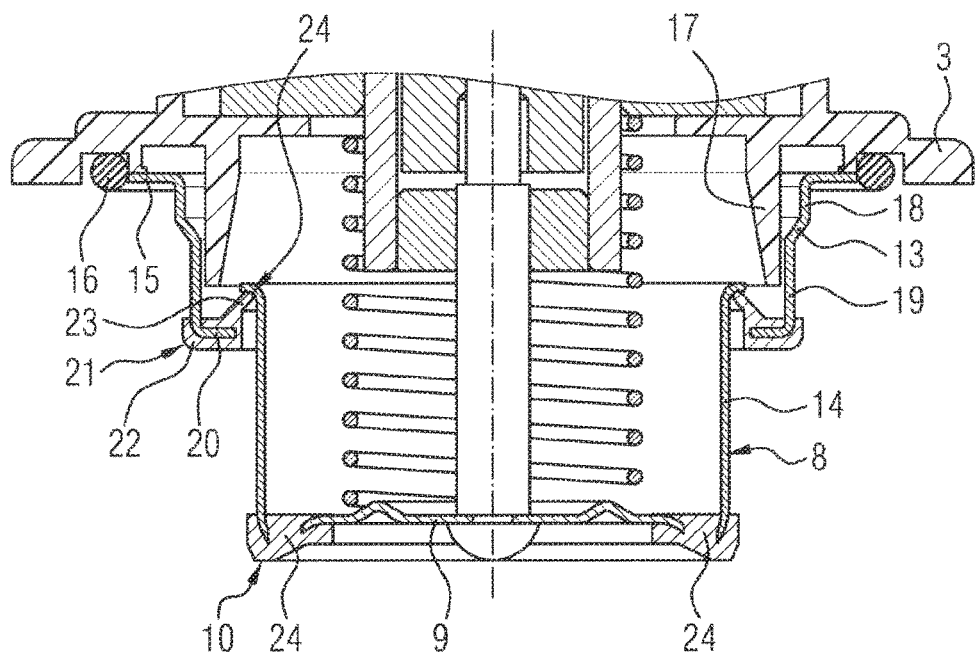
FIG. 2 is an enlarged illustration of the second housing part.

FIG. 2 shows the second housing part 13 with its cylindrical basic shape and the piston 8 with its cylindrical lateral surface 14 in a closed position. Housing part 13 and piston 8 are deep-drawn parts composed of chromium-nickel steel. The second housing part 13 has, at its end facing toward the housing 1, a radially outwardly pointing edge 15. An O-ring that acts as a seal 16 is arranged in the housing 1 concentrically with respect to the edge 15 in the housing 1. The housing 1 has a cylindrical portion 17 that extends from the solenoid 5 in the direction of the piston 8. The second housing part 13 is pressed onto the cylindrical portion 17 to such an extent that edge 15 bears against the housing 1. For a defined abutment surface for the press-fitting, the second housing part 13 has a cylindrical lateral surface with two diameters. The larger diameter 18 is oriented toward the housing 1 and is larger than the cylindrical portion 17, whereas the smaller diameter 19 is selected such that the inner side forms the contact surface for the press-fit connection with the portion 17. The region of the larger diameter 18 serves for the decoupling of the abutment surface 15 on the housing 1 and the press-fit connection in the region of the smaller diameter 19.

The second housing part 13 furthermore has, at its end averted from the housing 1, a collar 20, which is bent through 90° and which points radially inward. A seal 21 arranged on the second housing part 13 surrounds a region of the housing part 13. The region encompasses a part of the cylindrical lateral surface 19 and the collar 20. Lateral surface 19 and collar 20 form an undercut, which prevents a detachment of the seal 21. The seal 21 composed of fluorinated rubber is composed of a main body 22, which surrounds the stated region on the second housing part 13, and of a sealing lip 23 pointing in the direction of the housing. The sealing lip 23 interacts with a sealing surface 24 on the piston 8 in the form of an axial seal. For this purpose, the piston 8 has, at its end facing toward the housing 1, a radially outwardly projecting edge which, in the closed state of the valve, lies on the sealing lip 23.

The seal 10 is arranged on the crown 9 of the piston 8. A fluorinated rubber is used here. The seal 10 is vulcanized onto the piston 8. The crown 9 has multiple recesses 24 which are filled by the seal 10. In this way, the seal 10 is non-detachably connected to the piston 8.

Figure 3:
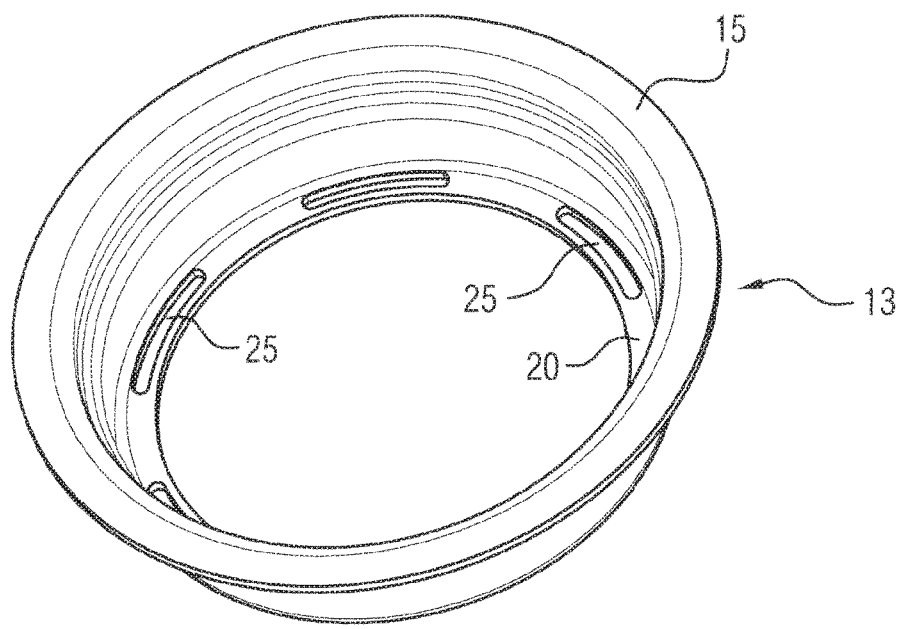
FIGS. 3 and 4 are a further refinement of the second housing part.

FIG. 3 shows the second housing part 13 without the seal 21. The collar 20 has 6 recesses 25, which likewise form undercuts for the seal 21, because the seal fills the recesses 25.

Figure 4:
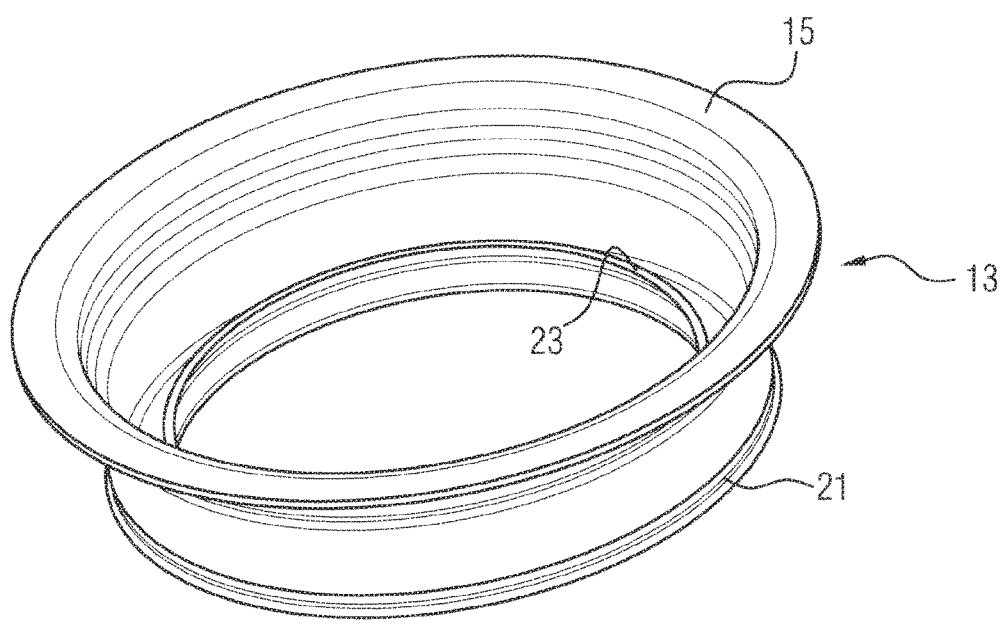

FIG. 4 shows the second housing part 13 with the seal 21 and with the sealing lip 23 oriented toward the piston.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A valve comprising:
   a housing;
   a solenoid arranged in the housing;
   a pin that has a longitudinal axis and is movable by the solenoid;
   a piston connected to the pin;
   a second housing part that bears against the housing at a first end and which partially accommodates the piston, wherein a second end of the second housing part extends radially towards the longitudinal axis; and
   a seal arranged between the second housing part and piston, wherein the seal consists of a base portion and a single sealing lip, wherein the single sealing lip extends from the base portion at an angle and extends radially towards the longitudinal axis,
   wherein the base portion of the seal is integrally formed on and surrounds the second end of the second housing part and surrounds a region of the second housing part such that the region of the second housing part forms at least one undercut for the seal.

2. The valve as claimed in claim 1, wherein the at least one undercut comprises at least one region formed by a radius.

3. The valve as claimed in claim 1, wherein the at least one undercut comprises at least one region has as least one of:

at least one recess,
2 to 12 recesses, and
4 to 8 recesses.

4. The valve as claimed in claim 1, wherein the seal is composed of an FKM rubber.

5. The valve as claimed in claim 1, wherein the seal is vulcanized on the second housing part.

6. The valve as claimed in claim 1, wherein the seal has a sealing lip that acts in an axial direction.

7. The valve as claimed in claim 1, wherein the second housing part is composed of at least one of:
   metal,
   high-grade steel, and
   a chromium-nickel steel.

8. The valve as claimed in claim 1, wherein the second housing part is a deep-drawn part.

9. The valve as claimed in claim 8, wherein the piston is at least one of:
   metal,
   high-grade steel, and
   a chromium-nickel steel.

10. The valve as claimed in claim 1, wherein the piston is a deep-drawn part.

11. The valve as claimed in claim 1, wherein the at least one undercut is a recess defined in the second end of the second housing part that extends radially towards the longitudinal axis.

* * * * *